(12) United States Patent
Chamberlain et al.

(10) Patent No.: US 8,214,350 B1
(45) Date of Patent: Jul. 3, 2012

(54) PRE-COMPUTED IMPRESSION LISTS

(75) Inventors: Dawn Chamberlain, Mountain View, CA (US); Gurmeet Singh Manku, Mountain View, CA (US); Barbara Stanley, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 396 days.

(21) Appl. No.: 12/348,170

(22) Filed: Jan. 2, 2009

(51) Int. Cl.
*G06F 7/00* (2006.01)
*G06F 17/30* (2006.01)

(52) U.S. Cl. ......... 707/709; 707/E17.014; 707/E17.116; 707/E17.117; 715/234; 715/236; 715/968

(58) Field of Classification Search ............ 707/706, 707/709, 731, 763, 769, 710, E17.014, E17.116, 707/E17.117; 709/203; 715/234, 236, 744, 715/968
See application file for complete search history.

(56) References Cited

U.S. PATENT DOCUMENTS

| | | | | |
|---|---|---|---|---|
| 2003/0033279 | A1* | 2/2003 | Gibson et al. | 707/1 |
| 2005/0033803 | A1* | 2/2005 | Vleet et al. | 709/203 |
| 2005/0257158 | A1* | 11/2005 | Lombardo | 715/751 |
| 2006/0112178 | A1* | 5/2006 | Van Vleet et al. | 709/224 |
| 2006/0143084 | A1* | 6/2006 | Donnelli et al. | 705/14 |
| 2006/0179053 | A1* | 8/2006 | von Ahn Arellano et al. | 707/6 |
| 2006/0212350 | A1* | 9/2006 | Ellis et al. | 705/14 |
| 2006/0224938 | A1* | 10/2006 | Fikes et al. | 715/500 |
| 2008/0040143 | A1* | 2/2008 | Freeman et al. | 705/1 |
| 2008/0114624 | A1* | 5/2008 | Kitts | 705/7 |
| 2008/0276163 | A1* | 11/2008 | Takagi et al. | 715/234 |
| 2009/0125504 | A1* | 5/2009 | Adams et al. | 707/5 |
| 2009/0276407 | A1* | 11/2009 | Van Vleet et al. | 707/3 |

OTHER PUBLICATIONS

WEBCONNECT.COM/ICS/NETBUYER.HTML WWW.WORLDDATA.COM, (11_843281) date Sep. 2000 (pp. 1-2).*
Hisae Ueki Motoei Azuma—"Background Color Coordination Support System for Web Page Design"—Proceedings of the Second IEEE International Conference on Cognitive Informatics (ICCI'03)—2003 IEEE (pp. 1-7).*
Mei Kobayashi and Koichi Takeda—"Information Retrieval on the Web"—ACM Computing Surveys, vol. 32, No. 2, Jun. 2000 (pp. 144-173:1-30).*

* cited by examiner

*Primary Examiner* — Giovanna Colan
*Assistant Examiner* — Anh Ly
(74) *Attorney, Agent, or Firm* — Fish & Richardson P.C.

(57) ABSTRACT

Systems, methods, and computer program products identify one or more web page impressions satisfying one or more simply queries, each of the one or more web page impressions associated with a respective impression ID. Respective impression IDs of the one or more web pages satisfying the one or more simple queries are stored in an impression log. Subsequent to storing the respective impression IDs, a query is received from a client device, and a number of impression IDs for the one or more web pages satisfying the query are identified based on the identified one or more web page impressions satisfying the one or more simple queries.

24 Claims, 4 Drawing Sheets

PRE-COMPUTED IMPRESSION LISTS

FIELD

This document relates to information delivery.

BACKGROUND

Internet advertisers often attempt to place Internet ads on web pages that are likely to generate revenue. In assessing web pages that are likely to generate revenue, advertisers can look for pages having a certain set of attributes associated with viewers. Web page attributes can include the location of a viewer, including the viewers country, city, state, metro region, and/or zip/postal code, time of day the user is viewing a page, the viewer's browser type, the viewer's operating system, the viewer's browser language, the date, and other criteria associated with a viewer. For instance, if an advertiser knows that the target audience for a product is a female in the Southeast, the advertiser can seek to place ads on websites most likely to be viewed by females in the Southeast.

Webpage attributes can be collected and stored so that the attribute may be later searched to identify web pages that an advertiser may wish to advertise on. Attributes for each webpage can be stored, which can include 20 or more attributes each having numerous values. For instance, a gender attribute may have two values, male and female. The number of combinations of attributes and their associated values for Internet webpages is enormous, creating difficulties in storing and searching through attributes to identify webpages desirable to an advertiser.

SUMMARY

The present disclosure describes systems, methods, and computer program products that provide content.

In general, one aspect of the subject matter described in this specification can be implemented in methods, systems and computer program products. One method includes identifying one or more web page impressions satisfying one or more simple queries, each of the one or more web page impressions associated with a respective impression ID, and storing the respective impression IDs of the one or more web pages satisfying the one or more simple queries. The method also includes receiving a the query from a client device, subsequent to storing the respective impression IDs, and identifying the a number of impression IDs for the one or more web pages satisfying the query based on the identified one or more web page impressions satisfying the one or more simple queries.

According to one feature the method includes storing a plurality of attributes and associated values for the one or more web pages. According to another feature, the method includes determining the number of criteria included within the query. According to yet another feature, the method can include comparing the number of criteria to a predetermined number of 'K' criteria.

Identifying the number of impression IDs for the one or more web pages satisfying the query based on the identified one or more web page impressions satisfying the one or more simple queries can occur if the number of criteria is less than or equal to the predetermined number 'K'. According to another feature, the query can be divided into one or more sub-queries if the number of criteria exceeds the predetermined number 'K'.

According to yet another feature, the method can include storing a number of web page impressions satisfying the one or more simple queries. Additionally or alternatively, the query can include a plurality of terms, and each of the one or more simple queries can includes at least a subset of the plurality of terms. According to still another feature, the method can include identifying an intersection of each of the one or more simple queries to identify the a number of impression IDs for the one or more web pages satisfying the query.

Another method can include identifying one or more web page impressions satisfying a first query criteria, identifying one or more web page impressions satisfying a second query criteria, and storing in an impression log respective impression IDs associated with the respective one or more web pages satisfying the first query criteria and associated with the respective one or more web pages satisfying the second query criteria. The method also includes receiving a query from a client device subsequent to storing the respective impression IDs, the query including the first query criteria and the second query criteria, and identifying the number of web page impressions satisfying the query as the number of impression IDs associated with both the one or more web pages satisfying the first query criteria and one or more web pages satisfying the second query criteria According to one feature the method includes dividing the query into two queries having, respectively, the first query criteria and the second query criteria. According to another feature the method includes storing a plurality of attributes and associated values for the one or more web page impressions satisfying the first query criteria or the second query criteria. The first query criteria and the second query criteria can be mutually exclusive. According to yet another feature, the method can include determining that the query received from the client device exceeds a predetermined number of criteria.

These general and specific aspects may be implemented using a system, a method, or a computer program, or any combination of systems, methods, and computer programs.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
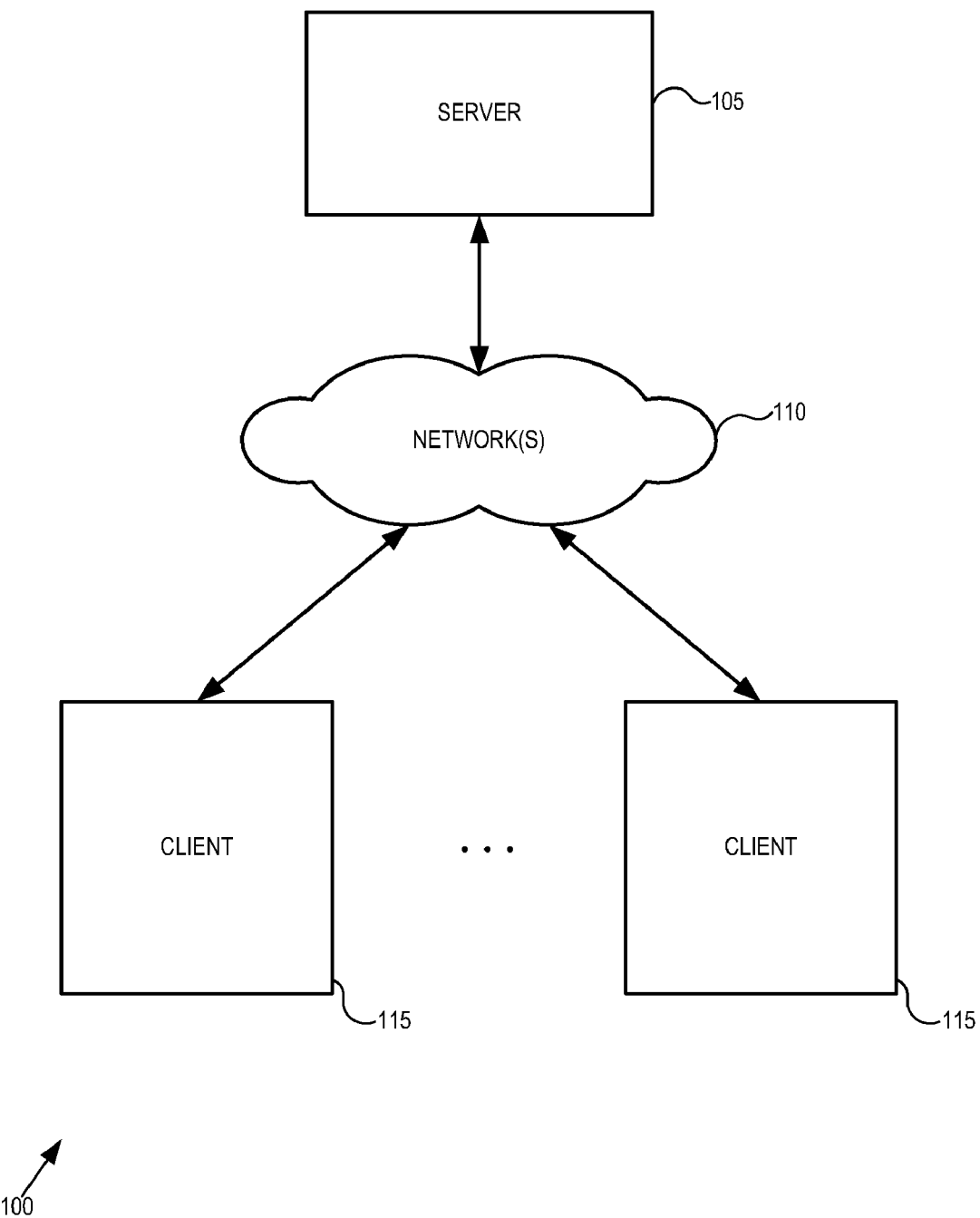
FIG. 1 shows an example advertising system.

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

The following disclosure describes systems, methods, and computer program products that compute the number and identity of web page impressions that satisfy a query including one or more criteria. In some implementations the answer to the query may be pre-calculated prior to the submission of the query by a user. In some implementations, an answer to one or more portions of the query are used to identify an answer to the query.

This disclosure is described with reference to block diagrams and flowchart illustrations of methods, apparatuses (i.e., systems) and computer program products. It will be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function(s) specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the function(s) specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 shows an example of an advertising system 100. The system 100 generally includes at least one server 105 in communication with one or more clients 115 via at least one network 110. The clients 115 can each include a device, such as a personal computer, a wireless telephone, a personal digital assistant (PDA), a lap top computer, or another type of computation or communication device, a thread or process running on one of these devices, and/or an object executable by one of these devices. The server 120 can include one or more servers that gather, store, process, maintain, and/or manage web page impressions, including webpage attributes, and process complex queries. The complex queries can be used to search the stored webpage attributes to identify web pages that an content provider (e.g., advertiser) may wish to publish (e.g., advertise) on.

Although two clients 115 and a single server 105 are illustrated in FIG. 1, there can be more servers and more or fewer clients. For instance, some of the functions performed by the server 105 can be performed by one or more other servers such that the server 105 can represent several devices, such as a network of computer processors and/or servers. The network(s) 110 can include one or more local area networks (LANs), wide area networks (WANs), telephone networks, such as the Public Switched Telephone Network (PSTN), intranets, the Internet, and/or or other type of network. The client(s) 115 and server 120 can connect to the network(s) 110 via wired, wireless, or optical or other connections. In alternative implementations, one or more of the devices illustrated in FIG. 1 are directly connected to another one of the devices. For example, in one implementation, the clients 115 are directly connected to the server 120.

Figure 2:
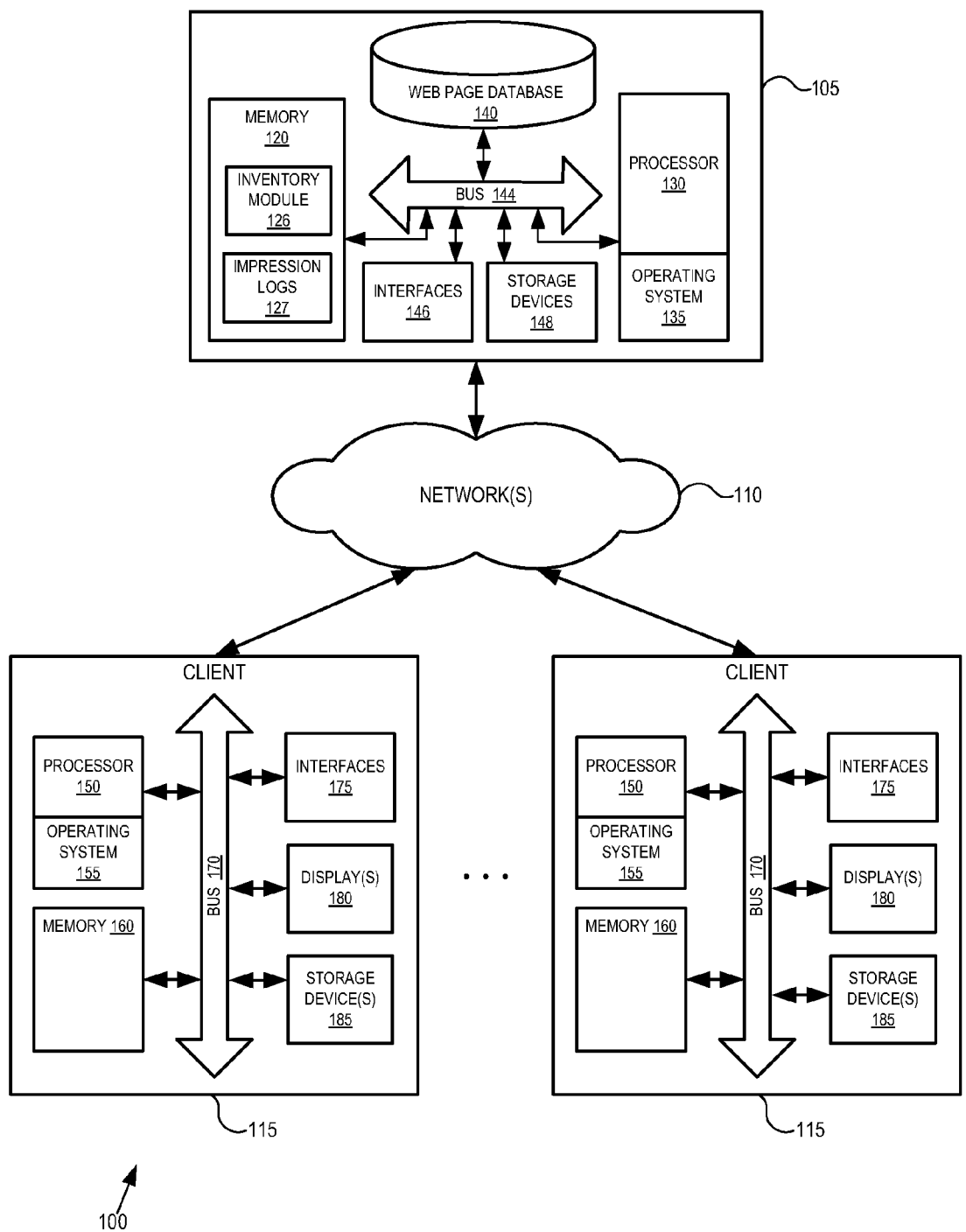
FIG. 2 shows a more detailed view of the advertising system of FIG. 1.

FIG. 2 shows a detailed view of the system 100 shown in FIG. 1. The server 105 generally includes a processor 130, an operating system 135, a memory 120 including an inventory module 126, impression logs 127, a web page database 140, one or more interface(s) 146, one or more storage device(s) 148, and a bus 144. The bus 144 can include one or more paths that permit communication among the components of server 105.

The processor 130 includes any type of conventional processor, microprocessor or processing logic that interprets and executes instructions, and works in conjunction with the operating system 135 to execute instructions stored in the memory 120 and/or storage devices 148 of the server 105. The memory 120 can include a random access memory (RAM) or another type of dynamic storage device that stores information and instructions for execution by the processor 130. The storage device(s) 148 can include a conventional ROM device or another type of static storage device that stores static information and instructions for use by the processor 130. Additionally, the storage device(s) 148 can include a magnetic and/or optical recording medium and its corresponding drive. According to some implementations, although the operating system 135 is shown as separate from the memory 120 and storage device(s) 148, the operating system 135 may be stored within the memory 120 and/or storage device(s) 148.

The server 105 includes one or more interfaces 146 that permit input to the server 105 via one or more conventional mechanisms, such as a keyboard, a mouse, a pen, voice recognition and/or biometric mechanisms, or the like. The interface(s) 146 can also permit output from the server 105 via one or more conventional mechanisms, such as a display, a printer, a speaker, or the like. The interface(s) 146 can further include one or more communication interfaces that enable the server 105 to communicate with other devices and/or systems. For example, the interface(s) 146 can include mechanisms for permitting the server 105 to communicate with the clients 115 via one or more networks, such as the network(s) 110. The interface(s) is 146 can permit the server 105 to communicate with other servers, including Internet servers, to collect webpage impressions and attributes from clients 115 and other Internet servers (not illustrated).

In operation the server 105 can store webpage attributes and associated values for web page attributes corresponding to webpage impressions viewed by users in a web page database 140. The web page database 140 can store attributes and values for webpage impressions collected over a period of time, such as 30 days or more. Additionally, an impression ID may be stored within the web page database for each web page impression and/or for each attribute/value pair corresponding to a web page impression. In some implementations, the web page database may be indexed by the impression ID, thus not requiring it to be specifically stored. Although only a single database 140 is illustrated in FIG. 2, webpage impressions and webpage attributes may be stored in several databases, either internal or external to the server 105. For instance, the server 105 may retrieve webpage impressions and/or webpage attributes from a remote location on the Internet via the interface(s) 146 and the network(s) 110.

The inventory module 126 is operable to query the webpage attributes to pre-compute results to queries (e.g., simple queries), which may be used to efficiently solve more complex queries. In some implementations, the software instructions for permitting complex queries to be answered quickly can be contained in/executed by the inventory module 126. The inventory module 126 can store results of pre-computed simple queries in one or more impression logs 127.

The software instructions can be read into the memory 120 from another computer readable medium, such as the storage device(s) 148, or from another device via the interface(s) 146. Software instructions contained in the memory 120 cause processor 130 to perform processes described in this disclosure. Alternatively, hardwired circuitry can be used in place of or in combination with software instructions to implement processes consistent with the disclosure. Thus, implementations are not limited to any specific combination of hardware circuitry and software.

The client device(s) 115 include a processor 150, an operating system 155, a memory 160, one or more interface(s) 146, one or more display(s) 180, one or more storage device(s) 185, and a bus 170. The bus 170 includes one or more paths, such as data and address bus lines, to facilitate communication between the processor 150, operating system 155 and the other components within the client 115. The processor 150 executes the operating system 155, and together the processor 150 and operating system 155 are operable to execute functions implemented by the client 115, including software instructions contained in a computer-readable medium stored in the memory 160.

The memory 160 can include random access memory, read-only memory, a hard disk drive, a floppy disk drive, a DVD or CD Rom drive, or optical disk drive, for storing information on various computer-readable media, such as a hard disk, a removable magnetic disk, or a DVD or CD-ROM disk. Additionally, the interface(s) can control input/output devices of the client 115, such as a video display, a keyboard, a scanner, a mouse or joystick or other input or output devices. The interface(s) can also include one or more input/output ports and/or one or more network interfaces that permit the client 115 to receive and transmit information, such as from and to the server 105, such as via the network(s) 110.

The server 105 and clients 115 illustrated in FIG. 2 support combinations of means for performing the specified functions described herein. As noted above, it will also be understood that each block of the block diagrams, and combinations of blocks in the block diagrams, can be implemented by special purpose hardware-based computer systems that perform the specified functions or steps, or combinations of special purpose hardware and computer instructions. Further, the server 105 and clients 115 can each be embodied as a data processing system or a computer program product on a computer-readable storage medium having computer-readable program code means embodied in the storage medium. Any suitable computer-readable storage medium may be utilized including hard disks, CD-ROMs, DVDs, optical storage devices, or magnetic storage devices. Accordingly, the server 105 and/or clients 115 may take the form of an entirely hardware embodiment, an entirely software embodiment or an embodiment combining software and hardware aspects, such as firmware.

Furthermore, though illustrated individually in FIG. 2, each component of the server 105 and clients 115, respectively, may be combined with other components within the server 105 and/or clients 115 to effect the functions described herein. According to some implementations, one or more clients 115 can store webpage impressions and webpage attributes in addition to or as an alternative to the storage of webpage impressions and webpage attributes by the server 105 or by another entity in communication with the server 105 via the network(s) 110. Thus, the web page database 140 may be distributed among one or more clients 115.

The disclosure will next describe the function of the system 100 with reference to illustrative process flow diagrams and an illustrative algorithm for solving complex queries.

A. Inventory Module and Impression Logs

As previously described with respect to FIG. 2, the web page database 140 stores web page attributes and associated values corresponding to web pages viewed by one or more clients. For instance, a 'country' attribute may have a value of 1 to indicate the U.S., the value of 2 to indicate China, and so on. As another illustrative example, a 'browser' attribute may have the value of 1 to indicate the Firefox™ web browser, the value of 2 to indicate Microsoft Internet Explorer, and so on.

The attributes and values for each web page impression is used by the inventory module to respond to queries requesting webpage impression data, such as the number of impressions that satisfy some combination of web page attribute and values. The attributes and their respective values (the combination of which are referred to as 'criteria') can each be used as a filter for a query. For example, a query can include a single criteria to identify impressions that match the attribute/value combination "country=US". Queries can include multiple criteria in order to identify impressions having multiple attribute/value combinations.

The inventory module 126 includes instructions for generating the one or more impression logs, and for permitting queries to be answered quickly using the web page database 140 and the one or more impression logs 127. The impression logs 127 store the number of impressions that satisfy simple queries. According to some implementations, the impression logs 127 store results of a pre-computation of answers to simple queries, where pre-computation means that the results are computed prior to a user submission of a query. This can occur, for instance, daily, such as in an overnight process. According to some implementations, simple queries are those queries having up to 'K' criteria. For instance, a simple query may be those queries with up to 6 (IC) criteria. Queries having more than 'K' criteria are deemed to be 'complex', and in some implementations the inventory module 126 does not precompute answers to those queries. The specific number of attributes that define a boundary between simple and complex queries can vary.

The results stored in the impression logs 127 can include the number of web page impressions satisfying the query. In some implementations the results can include an impression ID that identifies attribute/value pairs for web page impressions stored within, e.g., the web page database 140. For example, a simple query may be the number of web page impressions that occurred on a specific Monday, between 9 and 10 am, for users from a particular zip code. The number of impressions (i.e., impression count) can be pre-computed by the inventory module 126 and stored in an impression log 127. According to some implementations, the list of impressions corresponding to the minimum count can also be stored and accessed by the inventory module 126. The impressions may be identified, for instance, by an impression ID, such that the impression log includes both the total count (i.e., number of impressions) corresponding to a pre-computed query and a list of impression IDs corresponding to the web page impressions that satisfy the query. According to some implementations, the use of impression IDs to identify a web page impression permits a reduction in the required storage capacity of the impression logs as compared to the storage of all of the attributes and values for each impression. If the attributes and values for a particular impression are required, the impression ID can be used to look up those details for the impression.

According to some implementations, the answers to complex queries can be computed by the inventory module using web page impressions corresponding to a pre-computed simple query. For instance, a list of impressions corresponding to a simple query contained within (i.e., as a subset of) a complex query may be identified. The remaining criteria (i.e., the portion of the complex query that are not contained within the simple query) may be compared to the web page impressions identified by the results for the pre-computed simple query.

Referring again to the previous example, a complex query may seek impressions occurring on a particular Monday, between 9 and 10 am, for users from a particular zip code, from clients having a particular operating system, and from clients employing a particular browser language. In this example the pre-computed answer to the simple query, the web page impressions occurring on the particular Monday, between 9 and 10 am, for users from a particular zip code, identifies a count of web page impressions. The web page impressions corresponding to that count may be compared against the additional criteria of the complex query (i.e., clients having a particular operating system, and employing a particular browser language) to identify the number of pages satisfying the complex query, as well as the impression IDs for those web pages. According to some implementations, the impression IDs for the answer to the simple query identify the attribute/value pairs against which the additional criteria from the complex query are compared to identify the number of web page impressions satisfying the complex query.

B. Intersection of Lists of Impression IDs

The answer to a query having a large number of criteria for a web page impression can be computed by intersecting two lists of criteria contained within the larger number of criteria. For example, the impressions that match the query "country=US, browser=MSIE, OS=Windows, and language=English" is the intersection of the set of impressions that match the query "country=US and browser=MSIE" with the set of impressions that match the query "OS=Windows and language=English." The inventory module 126 can use intersections of pre-computed answers to identify the answers (e.g., number of web page impressions) to complex queries.

As described above, a list of impression IDs can be stored within the impression logs 127 for pre-computed queries having 'K' or less criteria. If a query is 'complex', meaning that it has a greater number of criteria than 'K', then the query is divided into two or more sub-queries of, for example, size 'K'. For example, if 'K' is 3 and the query seeks impressions that match "country=US, browser=MSIE, OS=Windows, and language=English", then the query could be divided into a first sub-query "country=US, browser=MSIE, OS=Windows" and a second sub-query "browser=MSIE, OS=Windows, and language=English." The contents of the sub-queries need not be mutually exclusive, such that the criteria in the sub-queries can partially overlap as in the preceding example. However, in some implementations, each of the criteria in the original query must be present in at least one of the sub-queries.

The inventory module 126 identifies the pre-computed count for each sub-query. The pre-computed lists of impressions, for instance, as identified by the number of impression IDs, are identified, and the intersection of those impression IDs identifies the answer to the query. Referring to the above example, if the first sub-query "country=US, browser=MSIE, OS=Windows" is satisfied by impression IDs 1, 5, and 10 (where each impression ID corresponds to a particular web page impression), and the second sub-query "browser=MSIE, OS=Windows, and language=English" is satisfied by impression IDs 5, 10, and 12, then the intersection of the lists is impression IDs 5 and 10, representing two web page impressions.

According to some implementations, the inventory module 126 is operable to generate every combination of sub-query from a query. The inventory module 126 can then identify the pre-computed impression counts for each possible sub-query. According to some implementations, the inventory module 126 can identify the sub-queries that have the lowest number of web page impression counts, and use the impression IDs identified by those sets to determine the intersection.

Using the intersection of impression IDs permits the pre-computation of simple queries to solve a more complex query. Use of impression IDs also avoids the requirement that each attribute/value pair be considered for all web pages for every complex query. This increases the speed at which queries are identified and also reduces memory requirements.

Figure 3:
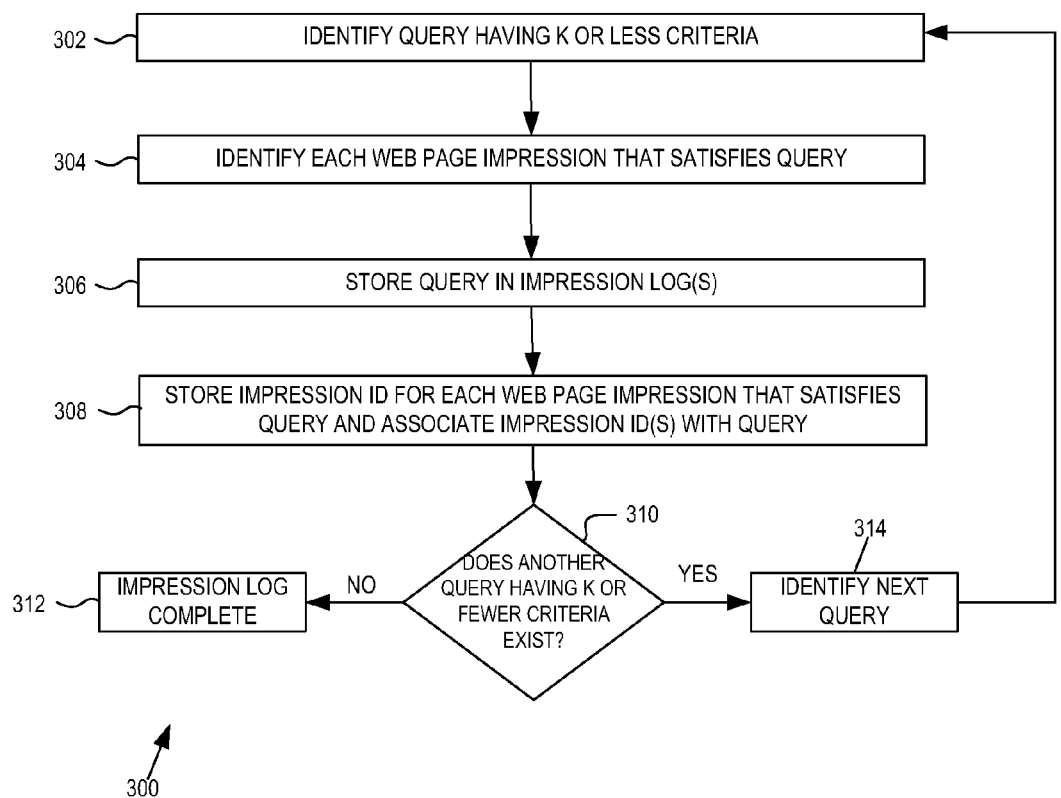
FIG. 3 shows an example process for generating an impression log.

FIG. 3 shows an example process 300 for generating an impression log. A query having K or less criteria is identified 302. According to some implementations, the query can be identified by the inventory module 126, for instance, from a list of popular queries. Each web page impression satisfying each of the K or less criteria of the query are identified. According to some implementations, the inventory module 126 can identify web page impressions by comparing the criteria within the query to the attribute/value pairs associated with each web page impression stored in the web page database 140. The query is stored, for example, in an impression log 306, along with the impression ID of each web page impression satisfying the query 308. According to some implementations, the inventory module 126 can create the impression log and the store queries and impression IDs in the impression log. The process occurs for each query having K or fewer criteria 310, 312, 314. According to some implementations, a single impression log may be used to store all query and corresponding impression IDs. According to some implementations, multiple impression logs may be used.

Figure 4:
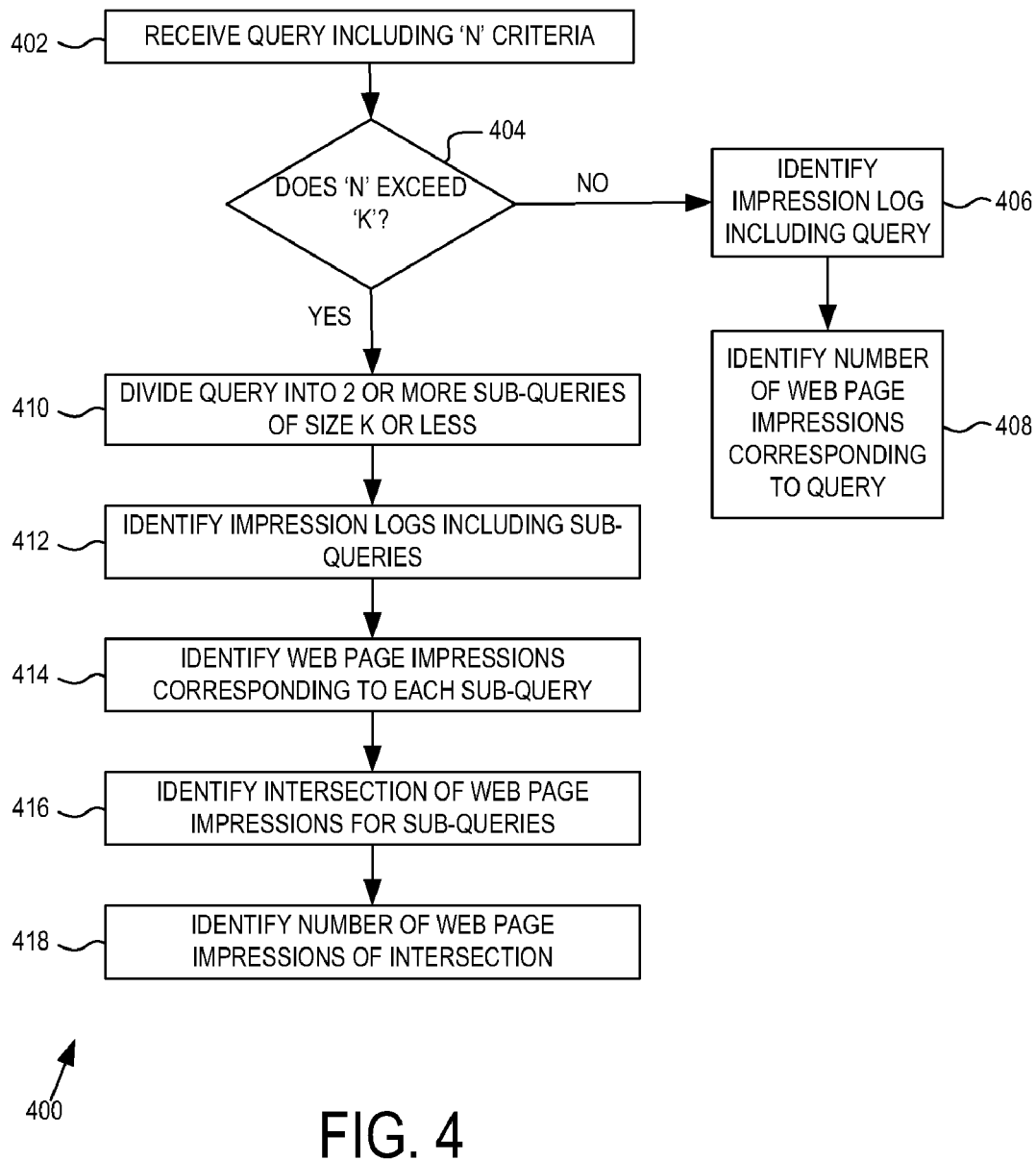
FIG. 4 shows an example process for determining the number of web page impressions that satisfy a query.

FIG. 4 shows an example process 400 for determining the number of web page impressions that satisfy a query. A query having 'N' criteria is received 402, for instance, at the server 105 from a client 115. If the query is simple (i.e., where 'N' does not exceed an administrator set value of 'K') 404, a query is identified 406 (e.g., from an impression log), and the number of web page impressions corresponding to the query are identified (e.g., from the impression log) 408. According to some implementations, the inventory module 126 can identify the query log and the number of web page impression corresponding to the query.

If the query is complex (i.e., where 'N' exceeds an administrator set value of 'K') 404, the query is divided into 2 or more sub-queries of size K or less 410.

According to some implementations, the inventory module 126 can divide the query into 2 or more sub-queries. Next, the sub-queries are identified (e.g., the impression logs associated with the sub-queries) 412, as are the web page impressions corresponding to each sub-query 414. According to some implementations, the web page impressions are identified by an ID associated with each web page impression or with each attribute/value pair for each web page impression.

Next, the intersection of web page impressions for the sub-queries are identified 416, and the number of web pages impressions of the intersection are identified 418. This information can be provided to the client responsive to the user-submitted query. According to some implementations, the inventory module 126 can perform each of the steps 410-418.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Many modifications and other implementations will come to mind to one skilled in the art having the benefit of the teachings presented in the foregoing descriptions and the associated drawings. Therefore, it is to be understood that the disclosure is not limited to the specific implementations disclosed and that modifications and other implementations are intended to be included within the scope of the appended claims. Although specific terms are employed herein, they are used in a generic and descriptive sense only and not for purposes of limitation.

That which is claimed:

1. A computer implemented method, comprising:
   identifying, by one or more processors, one or more web page impressions satisfying one or more simple queries, each of the one or more web page impressions associated with a respective impression ID, each web page impression being an instance of a previous presentation of a web page, where each web page has one or more attributes and associated values that describe entities that are targeted by the web page and where identifying one or more web page impressions includes comparing terms of a respective simple query to the one or more attributes and associated values of a given web page;
   storing the respective impression IDs of the one or more web pages satisfying the one or more simple queries;
   subsequent to storing the respective impression IDs, receiving a query from a client device;
   determining a number of criteria included within the query;
   comparing the number of criteria to a predetermined number; and
   identifying, by one or more processors, a number of impression IDs for the one or more web pages satisfying the query based on the identified one or more web page impressions satisfying the one or more simple queries,
   wherein identifying the number of impression IDs for the one or more web pages satisfying the query based on the identified one or more web page impressions satisfying the one or more simple queries occurs if the number of criteria is less than or equal to the predetermined number.

2. The method of claim 1, further comprising storing a plurality of attributes and associated values for the one or more web pages.

3. The method of claim 1, further comprising dividing the query into one or more sub-queries if the number of criteria exceeds the predetermined number.

4. The method of claim 1, further comprising storing a number of web page impressions satisfying the one or more simple queries.

5. A computer implemented method, comprising:
   identifying, by one or more processors, one or more web page impressions satisfying one or more simple queries, each of the one or more web page impressions associated with a respective impression ID, each web page impression being an instance of a previous presentation of a web page, where each web page has one or more attributes and associated values that describe entities that are targeted by the web page and where identifying one or more web page impressions includes comparing terms of a respective simple query to the one or more attributes and associated values of a given web page;
   storing the respective impression IDs of the one or more web pages satisfying the one or more simple queries;
   subsequent to storing the respective impression IDs, receiving a query from a client device;
   identifying, by one or more processors, a number of impression IDs for the one or more web pages satisfying the query based on the identified one or more web page impressions satisfying the one or more simple queries; and
   identifying an intersection of each of the one or more simple queries to identify a number of impression IDs for the one or more web pages satisfying the query,
   wherein the query contains a plurality of terms, and wherein each of the one or more simple queries includes at least a subset of the plurality of terms.

6. A computer implemented method, comprising:
   identifying, by one or more processors, one or more web pages impressions satisfying a first query criteria, each web page impression being an instance of a previous presentation of a web page, where each web page has one or more attributes and associated values that describe entities that are targeted by the web page and where identifying one or more impressions includes comparing terms of the first query criteria to the one or more attributes and associated values associated of a given web page;
   identifying, by one or more processors, one or more web pages impressions satisfying a second query criteria including comparing terms of the second query criteria to the one or more attributes and values of a given web page, the first query criteria and the second query criteria being mutually exclusive;
   storing respective impression IDs associated with the respective one or more web pages satisfying the first query criteria and associated with the respective one or more web pages satisfying the second query criteria;
   subsequent to storing the respective impression IDs, receiving a query from a client device, the query including the first query criteria and the second query criteria;
   identifying, by one or more processors, a number of web page impressions satisfying the query as the number of impression IDs associated with both the one or more web pages satisfying the first query criteria and one or more web pages satisfying the second query criteria; and
   determining that the query received from the client device exceeds a predetermined number of criteria.

7. The method of claim 6, further comprising dividing the query into two queries having, respectively, the first query criteria and the second query criteria.

8. The method of claim 6, further comprising storing a plurality of attributes and values for the one or more web page satisfying the first query criteria or the second query criteria.

9. A system comprising:
   one or more computers and one or more storage devices storing instructions that are operable, when executed by the one or more computers, to cause the one or more computers to perform operations comprising:
  identifying, by one or more processors, one or more web page impressions satisfying one or more simple queries, each of the one or more web page impressions associated with a respective impression ID, each web page impression being an instance of a previous presentation of a web page, where each web page has one or more attributes and associated values that describe entities that are targeted by the web page and where identifying one or more web page impressions includes comparing terms of a respective simple query to the one or more attributes and associated values of a given web page;
  storing the respective impression IDs of the one or more web pages satisfying the one or more simple queries;
  subsequent to storing the respective impression IDs, receiving a query from a client device;
  determining a number of criteria included within the query;
  comparing the number of criteria to a predetermined number; and
  identifying, by one or more processors, a number of impression IDs for the one or more web pages satisfying the query based on the identified one or more web page impressions satisfying the one or more simple queries,
  wherein identifying the number of impression IDs for the one or more web pages satisfying the query based on the identified one or more web page impressions satisfying the one or more simple queries occurs if the number of criteria is less than or equal to the predetermined number.

10. The system of claim 9, further comprising operations of storing a plurality of attributes and associated values for the one or more web pages.

11. The system of claim 9, further comprising operations of dividing the query into one or more sub-queries if the number of criteria exceeds the predetermined number.

12. The system of claim 9, further comprising operations of storing a number of web page impressions satisfying the one or more simple queries.

13. A non-transitory computer-readable medium storing software comprising instructions executable by one or more computers which, upon such execution, cause the one or more computers to perform operations comprising:
  identifying, by one or more processors, one or more web page impressions satisfying one or more simple queries, each of the one or more web page impressions associated with a respective impression ID, each web page impression being an instance of a previous presentation of a web page, where each web page has one or more attributes and associated values that describe entities that are targeted by the web page and where identifying one or more web page impressions includes comparing terms of a respective simple query to the one or more attributes and associated values of a given web page;
  storing the respective impression IDs of the one or more web pages satisfying the one or more simple queries;
  subsequent to storing the respective impression IDs, receiving a query from a client device;
  determining a number of criteria included within the query;
  comparing the number of criteria to a predetermined number; and
  identifying, by one or more processors, a number of impression IDs for the one or more web pages satisfying the query based on the identified one or more web page impressions satisfying the one or more simple queries,
  wherein identifying the number of impression IDs for the one or more web pages satisfying the query based on the identified one or more web page impressions satisfying the one or more simple queries occurs if the number of criteria is less than or equal to the predetermined number.

14. The medium of claim 13, further comprising operations of storing a plurality of attributes and associated values for the one or more web pages.

15. The medium of claim 13, further comprising operations of dividing the query into one or more sub-queries if the number of criteria exceeds the predetermined number.

16. The medium of claim 13, further comprising operations of storing a number of web page impressions satisfying the one or more simple queries.

17. A system comprising:
  one or more computers and one or more storage devices storing instructions that are operable, when executed by the one or more computers, to cause the one or more computers to perform operations comprising:
    identifying, by one or more processors, one or more web page impressions satisfying one or more simple queries, each of the one or more web page impressions associated with a respective impression ID, each web page impression being an instance of a previous presentation of a web page, where each web page has one or more attributes and associated values that describe entities that are targeted by the web page and where identifying one or more web page impressions includes comparing terms of a respective simple query to the one or more attributes and associated values of a given web page;
    storing the respective impression IDs of the one or more web pages satisfying the one or more simple queries;
    subsequent to storing the respective impression IDs, receiving a query from a client device;
    identifying, by one or more processors, a number of impression IDs for the one or more web pages satisfying the query based on the identified one or more web page impressions satisfying the one or more simple queries; and
    identifying an intersection of each of the one or more simple queries to identify a number of impression IDs for the one or more web pages satisfying the query,
    wherein the query contains a plurality of terms, and wherein each of the one or more simple queries includes at least a subset of the plurality of terms.

18. A non-transitory computer-readable medium storing software comprising instructions executable by one or more computers which, upon such execution, cause the one or more computers to perform operations comprising:
  identifying, by one or more processors, one or more web page impressions satisfying one or more simple queries, each of the one or more web page impressions associated with a respective impression ID, each web page impression being an instance of a previous presentation of a web page, where each web page has one or more attributes and associated values that describe entities that are targeted by the web page and where identifying one or more web page impressions includes comparing terms of a respective simple query to the one or more attributes and associated values of a given web page;
  storing the respective impression IDs of the one or more web pages satisfying the one or more simple queries;

subsequent to storing the respective impression IDs, receiving a query from a client device;

identifying, by one or more processors, a number of impression IDs for the one or more web pages satisfying the query based on the identified one or more web page impressions satisfying the one or more simple queries; and identifying an intersection of each of the one or more simple queries to identify a number of impression IDs for the one or more web pages satisfying the query, wherein the query contains a plurality of terms, and wherein each of the one or more simple queries includes at least a subset of the plurality of terms.

19. A system comprising:

one or more computers and one or more storage devices storing instructions that are operable, when executed by the one or more computers, to cause the one or more computers to perform operations comprising:

identifying, by one or more processors, one or more web pages impressions satisfying a first query criteria, each web page impression being an instance of a previous presentation of a web page, where each web page has one or more attributes and associated values that describe entities that are targeted by the web page and where identifying one or more impressions includes comparing terms of the first query criteria to the one or more attributes and associated values associated of a given web page;

identifying, by one or more processors, one or more web pages impressions satisfying a second query criteria including comparing terms of the second query criteria to the one or more attributes and values of a given web page, the first query criteria and the second query criteria being mutually exclusive;

storing respective impression IDs associated with the respective one or more web pages satisfying the first query criteria and associated with the respective one or more web pages satisfying the second query criteria;

subsequent to storing the respective impression IDs, receiving a query from a client device, the query including the first query criteria and the second query criteria;

identifying, by one or more processors, a number of web page impressions satisfying the query as the number of impression IDs associated with both the one or more web pages satisfying the first query criteria and one or more web pages satisfying the second query criteria; and determining that the query received from the client device exceeds a predetermined number of criteria.

20. The system of claim 19, further comprising operations of dividing the query into two queries having, respectively, the first query criteria and the second query criteria.

21. The system of claim 19, further comprising operations of storing a plurality of attributes and values for the one or more web page satisfying the first query criteria or the second query criteria.

22. A non-transitory computer-readable medium storing software comprising instructions executable by one or more computers which, upon such execution, cause the one or more computers to perform operations comprising:

identifying, by one or more processors, one or more web pages impressions satisfying a first query criteria, each web page impression being an instance of a previous presentation of a web page, where each web page has one or more attributes and associated values that describe entities that are targeted by the web page and where identifying one or more impressions includes comparing terms of the first query criteria to the one or more attributes and associated values associated of a given web page;

identifying, by one or more processors, one or more web pages impressions satisfying a second query criteria including comparing terms of the second query criteria to the one or more attributes and values of a given web page, the first query criteria and the second query criteria being mutually exclusive;

storing respective impression IDs associated with the respective one or more web pages satisfying the first query criteria and associated with the respective one or more web pages satisfying the second query criteria;

subsequent to storing the respective impression IDs, receiving a query from a client device, the query including the first query criteria and the second query criteria;

identifying, by one or more processors, a number of web page impressions satisfying the query as the number of impression IDs associated with both the one or more web pages satisfying the first query criteria and one or more web pages satisfying the second query criteria; and determining that the query received from the client device exceeds a predetermined number of criteria.

23. The medium of claim 22, further comprising operations of dividing the query into two queries having, respectively, the first query criteria and the second query criteria.

24. The medium of claim 22, further comprising operations of storing a plurality of attributes and values for the one or more web page satisfying the first query criteria or the second query criteria.

* * * * *